United States Patent [19]

Sakamoto et al.

[11] Patent Number: 4,703,245
[45] Date of Patent: Oct. 27, 1987

[54] METHOD AND APPARATUS FOR CONTROLLING PERMANENT MAGNET SYNCHRONOUS MOTOR BY USING PULSE WIDTH MODULATION

[75] Inventors: Keiji Sakamoto, Hachiouji; Toshio Kobayashi, Hino, both of Japan

[73] Assignee: Fanuc Ltd, Minamitsuru, Japan

[21] Appl. No.: 811,840

[22] PCT Filed: Apr. 16, 1985

[86] PCT No.: PCT/JP85/00207

§ 371 Date: Dec. 12, 1985

§ 102(e) Date: Dec. 12, 1985

[87] PCT Pub. No.: WO85/04993

PCT Pub. Date: Nov. 7, 1985

[30] Foreign Application Priority Data

Apr. 16, 1984 [JP] Japan .................. 59-75970

[51] Int. Cl.$^4$ ............................................. H02P 5/40
[52] U.S. Cl. .............................. 318/809; 318/805; 318/798
[58] Field of Search ............. 318/805, 798, 807–811, 318/800; 363/41

[56] References Cited

U.S. PATENT DOCUMENTS

| | | | |
|---|---|---|---|
| 3,662,247 | 5/1972 | Schieman | 363/41 |
| 3,851,234 | 11/1974 | Hoffman | 318/800 |
| 3,971,972 | 7/1976 | Stich | 363/41 |
| 4,310,791 | 1/1982 | Akamatsu | 318/809 |
| 4,330,741 | 5/1982 | Nagase et al. | 318/809 |
| 4,445,080 | 4/1984 | Curtiss | 318/798 |
| 4,456,868 | 6/1984 | Yamamura et al. | 318/800 |
| 4,458,192 | 7/1984 | Sakamoto et al. | 318/811 |
| 4,482,855 | 11/1984 | Otsuka et al. | 318/809 |

FOREIGN PATENT DOCUMENTS 53-58610 5/1978 Japan.

*Primary Examiner*—David Smith, Jr.
*Attorney, Agent, or Firm*—Staas & Halsey

[57] ABSTRACT

A method and apparatus for controlling a permanent magnet synchronous motor (M), wherein an inverter (4) is controlled in response to PWM signals (PA-PF) obtained by comparing a reference carrier wave (VA) with signals representing differences between armature winding current command signals (RTC, STC, TTC) of the respective phases and detected armature currents (IR, IS, IT).

The degree of saturation of the difference signals defined in association with a peak value of the reference carrier wave (VA) is detected. The phases of the current command signals (RTC, STC, TTC) are changed from those which provide an orthogonal relation between a resultant armature current and a main flux of a magnetic field.

12 Claims, 11 Drawing Figures

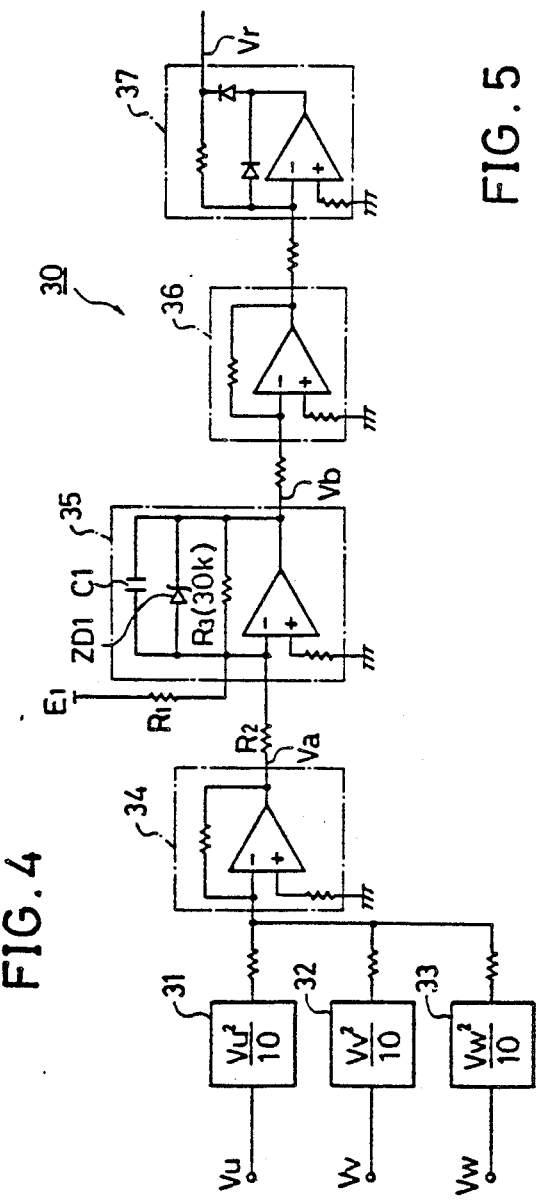
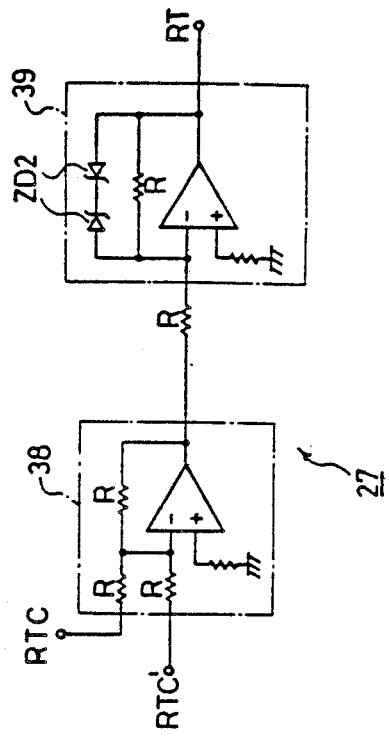
FIG. 4
FIG. 5

METHOD AND APPARATUS FOR CONTROLLING PERMANENT MAGNET SYNCHRONOUS MOTOR BY USING PULSE WIDTH MODULATION

BACKGROUND OF THE INVENTION

The present invention relates to a method and apparatus for controlling a synchronous motor in response to a PWM (Pulse Width Modulation) signal generated from a command input and a position signal of a rotating magnetic field and, more particularly, to a method and apparatus for controlling a permanent magnet synchronous motor having improved output torque characteristics.

FIG. 1 shows a conventional PWM control apparatus for a permanent magnet synchronous motor. Reference symbol E denotes a 3-phase power source. Reference numeral 3 denotes a rectifying circuit; 4, a transistor inverter; and 1, a transistor PWM control circuit. Reference symbol M denotes a permanent magnet synchronous motor. Reference numeral 2 denotes a rotor position detector, such as a pulse encoder, for detecting the position of a rotor in the permanent magnet synchronous motor M. The transistor PWM control circuit 1 compares a reference speed V0 with a present speed Vs of the rotor, which is obtained by processing a rotor position S detected by the rotor position detector 2. Transistors TA to TF in the transistor inverter 4 are turned on/off to control currents flowing through the U, V, and W phase windings of the permanent magnetic synchronous motor, thereby controlling the rotating speed of the motor. A typical arrangement of the transistor PWM control circuit 1 is illustrated in FIG. 2. Referring to FIG. 2, reference numeral 5 denotes a signal processor for calculating a voltage VS, representing the present rotor speed, in accordance with the rotor position detection output S; 6 and 7, ROMs for storing U and W phase command values corresponding to rotor positions, such that the resultant vector of currents flowing in the U, V, and W phases has a phase perpendicular to the main flux of a magnetic field generated by the rotor; and 8, a differential amplifier for amplifying the difference between the voltage V0, representing the speed command, and the voltage VS, representing the present speed from the signal processor 5, and generating an amplified difference signal. Reference numeral 9 denotes a filter which decreases gain at high frequencies and increases gain at low frequencies, and which clamps peak voltage with Zener diodes ZD. Reference numerals 10 and 11 denote multiplying digital/analog (D/A) converters. The multiplying D/A converter 10 multiplies an output voltage VE, which represents the difference between the speed command V0 and the present speed VS and which is generated by the filter 9, by the U command value read out from the ROM 6. Similarly, the multiplying D/A converter 11 multiplies the output voltage VE by the W command read out from the ROM 7. The multiplying D/A converters 10 and 11 generate U and W phase current commands RTC and TTC, respectively. Reference numeral 12 denotes an adder for adding the U and W phase current commands RTC and TTC, and generating a V phase current command STC which is shifted from the U and W phases by 120°. Reference numerals 13 and 14 denote detectors for detecting currents Iu and Iw flowing through the U and W armature windings of the synchronous motor M. Reference numeral 15 denotes an adder for adding the U and W phase currents IR and IT detected by the U and W phase current detectors 13 and 14 to calculate a V phase current IS. Reference numerals 16, 17, and 18 denote circuits for supplying the current command voltages representing the currents to be fed to the U, V, and W armature windings. The circuits 16, 17, and 18 have an identical arrangement except for input signals supplied to the respective circuits. The circuit 16 comprises an operational amplifier 19 for amplifying the difference between the U phase current command RTC and the present U phase detection current IR, and a low-pass filter 20 for transmitting only the frequency component of the reference carrier wave, which is output from the operational amplifier 19. The circuit 17 receives the V phase current command STC and the present current IS, and the circuit 18 receives the W phase current command TTC and the present current IT. Otherwise, the other arrangements of the circuits 17 and 18 are the same as those of the circuit 16. Reference numeral 21 denotes a circuit consisting of a PWM signal processor and a transistor base-driven amplifier (to be referred to as a PWM signal processor 21 hereinafter). The PWM signal processor 21 compares the signals from the circuits 16, 17, and 18 with the reference carrier wave VA and generates PWM signals PA to PF for turning the transistors TA to TF of the transistor inverter 4 on and off.

With the above arrangement, the permanent magnet synchronous motor M is controlled in the following manner. The differential amplifier 8 amplifies a signal representative of the difference between the speed command V0 and the present speed VS generated by the signal processor 5 which is operated in response to the rotor position signal S sent from the rotor position detector 2. The amplified signal is supplied as an error signal VE to the multiplying D/A converters 10 and 11 through the filter 9. The U and W phase ROMs 6 and 7 receive an address signal representing the present rotor position, from the signal processor 5, and supply U and W phase command values corresponding to the present rotor position to the multiplying D/A converters 10 and 11. The multiplying D/A converters 10 and 11 multiply the error signal VE by the command values from the ROMs 6 and 7 and generate U and W phase current commands RTC and TTC. The adder 12 adds the U and W phase current commands RTC and TTC to obtain the V phase current command STC. Operational amplifiers 19 in the circuits 16, 17, and 18 amplify the differences between the current commands RTC, STC, and TTC and the present U, V, W phase currents IR, IS, and IT detected by the U and W phase current detectors 13 and 14 and calculated by the adder 15. The amplified signals are filtered by the filters 20, and voltages corresponding to the respective phase command currents are supplied to the PWM signal processor 21. The processor 21 compares the voltages with the reference carrier wave VA and generates the PWM signals PA to PF through the transistor base-driven amplifier. The signals PA to PF are supplied to the transistor inverter 4 of FIG. 1, and the transistors TA to TF thereof are turned on/off to control the speed of the permanent magnet synchronous motor M.

In the conventional PWM control circuit described above, the optimal phase currents flow in the respective phase windings in accordance with the present rotor position, irrespective of the rotating speed of the permanent magnetic synchronous motor. Counter EMF increases in proportion to the motor speed of the permanent magnet synchronous motor M. In order to compensate for this increase, the voltage corresponding to the command current is increased. The output torque of the motor M changes in accordance with an increase-/decrease in currents flowing through the respective phase coils. When the motor speed exceeds a certain value, the load increases. As a result, the peak value of the difference voltage between the present value and each command current exceeds that of the reference carrier wave. In this case, however, when the difference voltage peak value reaches the carrier wave peak value, output torque is maximized. Even if the difference voltage peak value greatly exceeds the carrier wave peak value, a larger torque cannot be obtained.

In order to compensate for a decrease in output torque due to a phase difference between the rotor position and the actual current with an increase in rotating speed of the motor M, phase advance compensation is performed to obtain a constant torque irrespective of motor speed. This phase advance compensation scheme for permanent magnet synchronous motors is described in Japanese Patent Provisional Publication (KOKAI) No. 53-58610.

SUMMARY OF THE INVENTION

It is an object of the present invention to provide a method and apparatus for controlling a permanent magnet synchronous motor, wherein the conventional drawbacks are eliminated and a command current phase is shifted in accordance with the degree of saturation of a difference voltage between respective present phase currents of an armature and currents to be supplied to the respective phases of the armature, thereby increasing output torque.

In order to achieve the above object of the present invention, there is provided a method and apparatus for obtaining PWM signals by comparing a reference carrier wave with the difference between a detected armature current and a command signal of each phase armature winding, thereby controlling an inverter and hence the permanent magnet synchronous motor, wherein the degree of saturation of a difference voltage signal, representing the difference between the detected armature current and each phase current command signal and determined in association with the peak value of the reference carrier wave, is detected, and in accordance with the degree of saturation, the phases of the respective phase current command signals are shifted from those which render the resultant or combined armature current perpendicular to the main flux of the magnetic field.

In the method and apparatus for PWM control of a permanent magnet synchronous motor according to the present invention, when the load torque of the motor is increased, and accordingly the values of the commands which determine currents to be supplied to the respective phase coils of the synchronous motor are increased, the phases of the commands are automatically advanced in accordance with the degree of saturation of the difference between the commands and the detected armature currents of the respective coils, which degree is determined in light of the peak value of the reference carrier wave, so that the orthogonal phase characteristic between the total winding current and the main magnetic flux is changed, and the torque of the motor is increased. A decrease in torque with an increase in motor speed can thus be reduced, thereby making it easy to effect control of the synchronous motor.

BRIEF DESCRIPTION OF THE DRAWINGS

FIG. 4 is a block diagram of a saturation detector of FIG. 3;

FIG. 5 is a block diagram of a phase shifter of FIG. 3;

DETAILED DESCRIPTION OF THE PREFERRED EMBODIMENT

Figure 2:
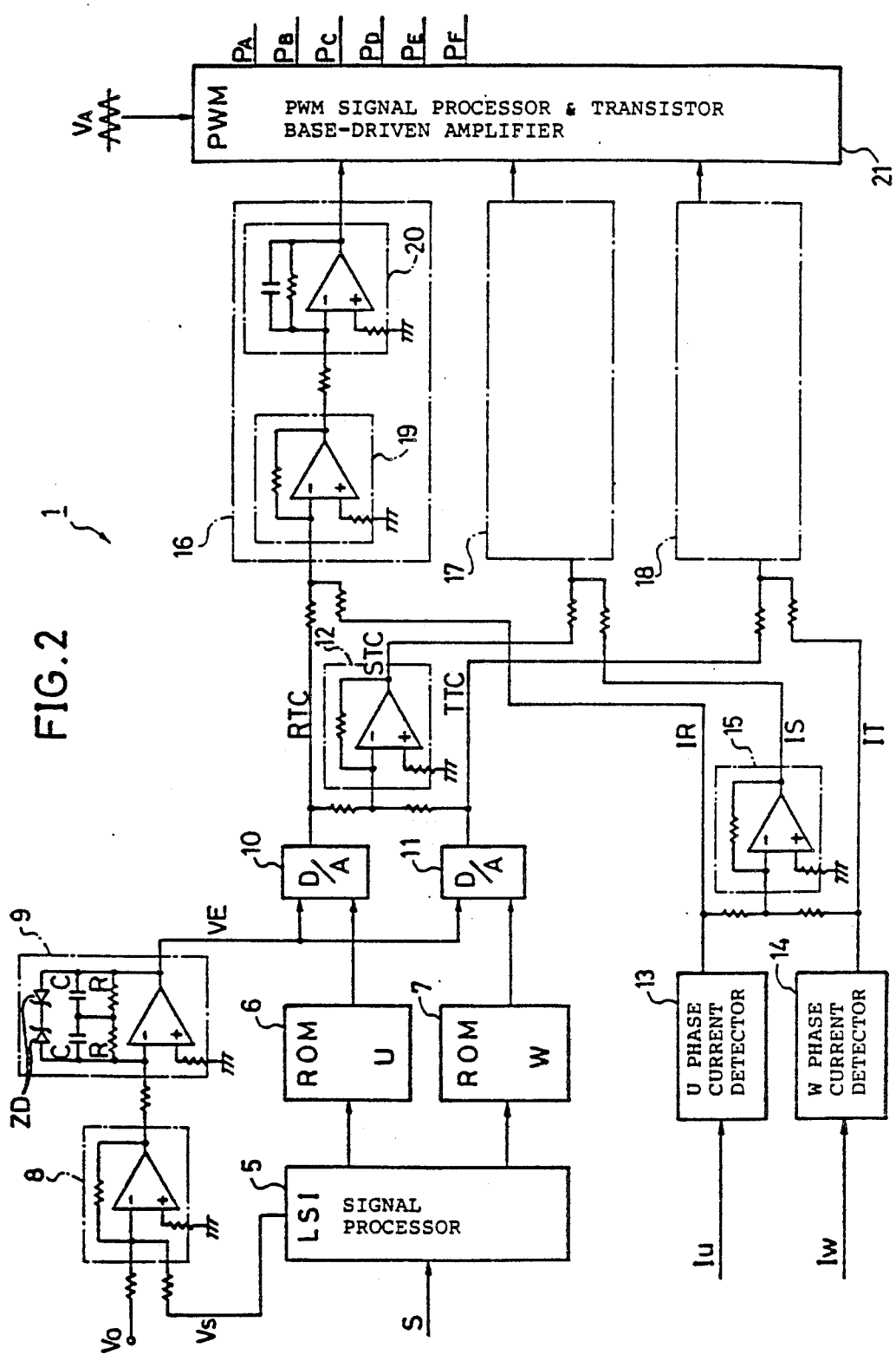
FIG. 2 is a block diagram of the transistor PWM control circuit of FIG. 1.
Figure 3:
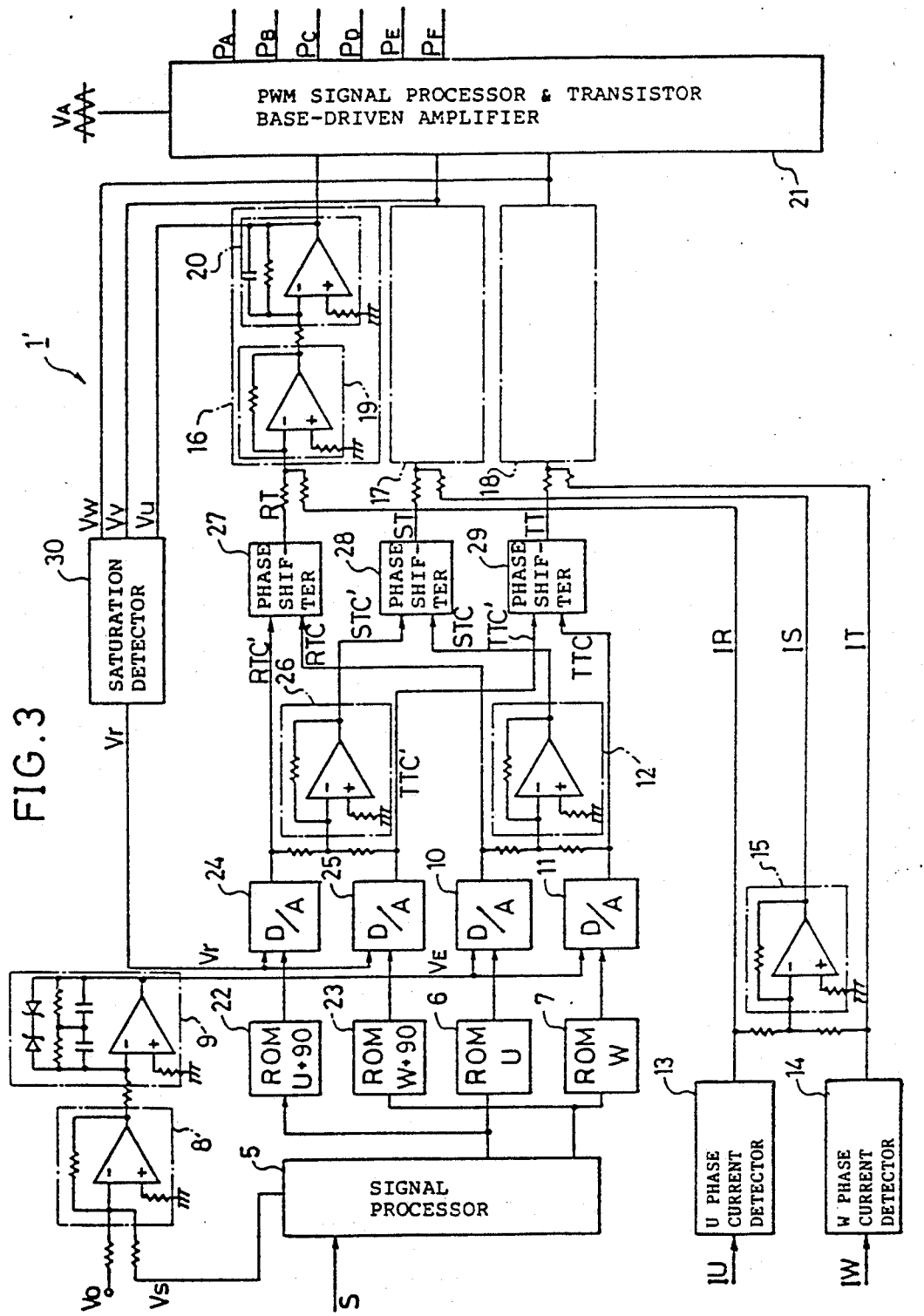
FIG. 3 is a block diagram of a transistor PWM control circuit according to an embodiment of the present invention.

FIG. 3 shows a transistor PWM control circuit 1' for exemplifying a control method according to an embodiment of the present invention. The transistor PWM control circuit 1' controls the transistor inverter 4 of FIG. 1, which in turn controls the permanent magnet synchronous motor M. The same reference numerals are employed in FIG. 3 to denote the same parts as those in the conventional PWM control circuit 1 of FIG. 2. The PWM control circuit 1' of FIG. 3 is very similar to that of FIG. 2, except that ROMs 22 and 23, a saturation detector 30, multiplying D/A converters 24 and 25, an adder 26, and phase shifters 27, 28, and 29 have been added. The ROMs 22 and 23 store commands to be output to the U and W phase windings in correspondence with the rotor positions so that the resultant vector of the respective phase currents advances by 90° from the phase which provides an orthogonal relation between the resultant vector and the main flux of the magnetic field. The saturation detector 30 detects the degree of saturation of the output voltages supplied from circuits 16, 17, and 18 to a PWM signal processor 21, the output voltages corresponding to the command signals to the respective phase coils. The multiplying D/A converters 24 and 25 multiply the output from the saturation detector 30 by the outputs from the ROMs 22, 23 which store therein output values of the U and W phases which are advanced by 90°, so as to generate corrected U and W phase current commands RTC' and TTC', respectively. The adder 26 adds the outputs from the multiplying D/A converters 24 and 25 to generate a corrected V phase current command STC'. The phase shifters 27, 28, and 29 add the corrected U, V, and W phase current commands RTC', STC', and TTC' and the U, V, and W current commands RTC, STC, and TTC from the multiplying D/A converters 10 and 11 and the adder 12, and advance the U, V, and W phases.

FIG. 4 shows the saturation detector 30, and FIG. 5 shows the phase shifter 27. Although their detailed arrangements are not illustrated, the phase shifters 28 and 29 have the same arrangement as the phase shifter 27 except that the input signals to the phase shifters 27, 28 and 29 are different. Referring to FIG. 5, corrected V and W phase current commands STC' and TTC' and the V and W phase current commands STC and TTC are used in place of corrected U phase current command RTC' and the U phase current command RTC.

Figure 6:
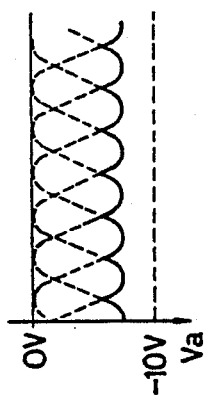
FIG. 6 is a graph for explaining the operation of the saturation detector.
Figure 7:
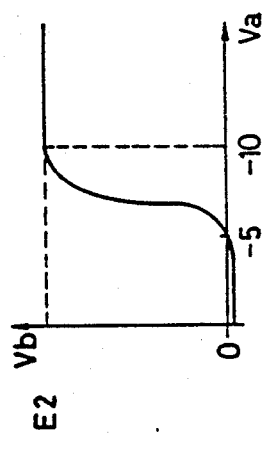
FIG. 7 is a graph of the input/output characteristics of a limiter amplifier of FIG. 4.
Figure 8:
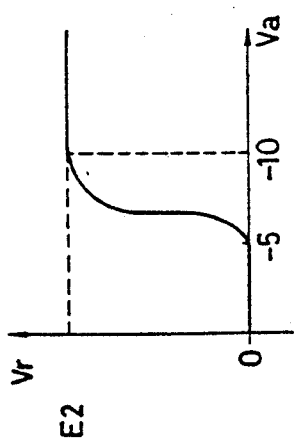
FIG. 8 is a graph of the input/output characteristics of an adder and a half-wave rectifier of FIG. 4.

In the saturation detector 30 of FIG. 4, voltages Vu, Vv, and Vw (the voltages Vu, Vv, and Vw vary within the range of ±10 V; each limit value, determined by the peak value of the reference carrier wave VA, is defined as the saturation voltage), corresponding to the U, V, and W phase command currents and to be supplied from the circuits 16, 17 and 18 to the PWM signal processor 21, are supplied to multipliers 31, 32, and 33, respectively. The voltages Vu, Vv, and Vw are squared and divided by 10 by the multipliers 31, 32, and 33, respectively. The resultant values are then added by an adder 34, which generates a voltage Va of 0 V to −10 V, as shown in FIG. 6. The output voltage Va is supplied to a limiter amplifier 35, and a capacitor C1 in the limiter amplifier 35 smoothes the voltage Va. A Zener diode ZD1 clamps the voltage Va up to a predetermined voltage E2 (7 V in this embodiment). The input/output characteristic curve of the limiter amplifier 35 is set as shown in FIG. 7. More specifically, the resistances of resistors R1 and R2 and a power source voltage E1 are determined such that the limiter amplifier 35 does not generate an output when the average voltage from the adder 34 exceeds a predetermined voltage. In this embodiment, the voltage E1 is set to 15 V, and the resistances of the resistors R1 and R2 are set to 10kΩ and 5.1kΩ, so that when the average voltage Va from the adder 34 is higher than −5 V, no output is generated. When the voltage is lower than −5 V, an output Vb is generated, as shown in FIG. 7. When the adder 34 generates an average voltage Va of −10 V as the saturation voltage, an output Vb of 7 V as the Zener voltage of the Zener diode ZD1 is generated. An output from the limiter amplifier 35 is inverted by an inverter amplifier 36 and passes through a half-wave rectifier 37. When the output voltage Va from the adder 34 is lower than −5 V, the inverted signal is then generated as a saturation signal Vr of 0 V to 7 V in accordance with the degree of saturation, as shown in FIG. 8.

In summary, when the peak voltages of the voltages corresponding to the U, V, and W phase command currents to be supplied to the PWM signal processor 21 reach the saturation voltage determined by the peak voltage of the reference carrier wave VA, the saturation voltage Vr is generated in accordance with the degree of saturation.

Referring back to FIG. 3, the operation of the embodiment will now be described.

Figure 1:
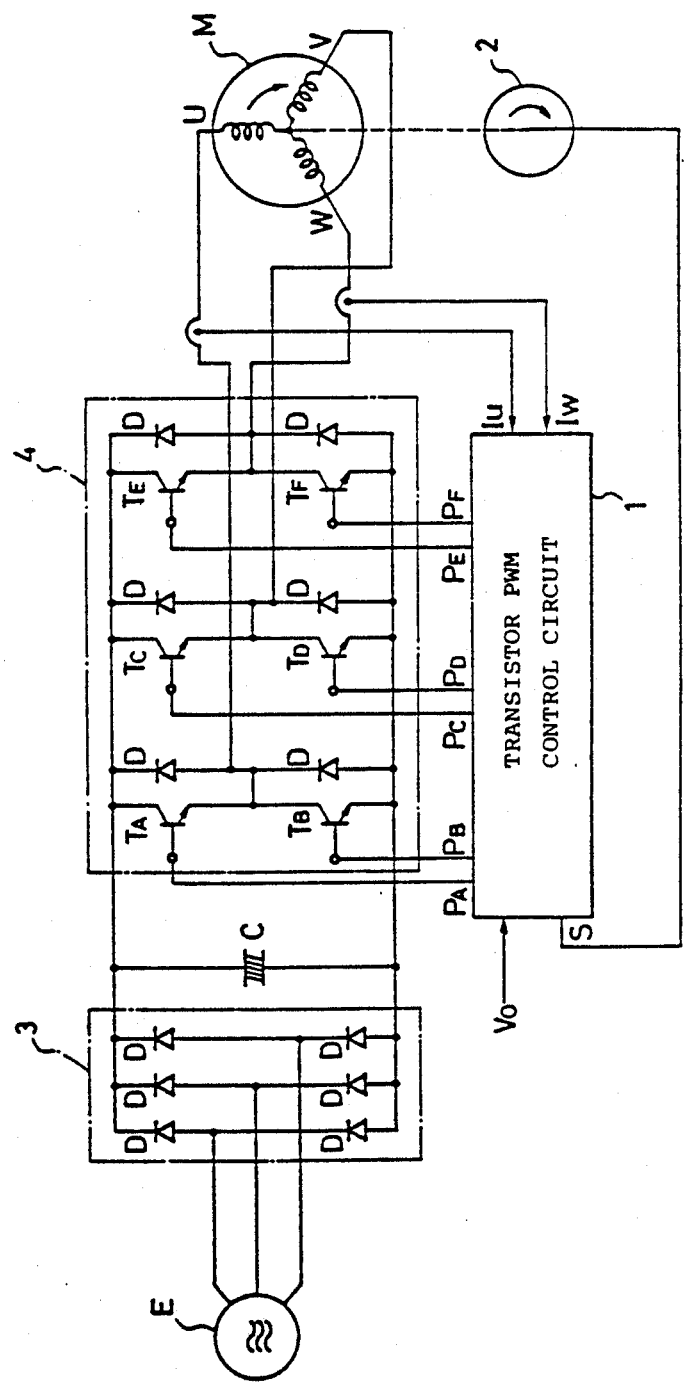
FIG. 1 is a circuit diagram of a control circuit for a conventional method of PWM control of a permanent magnet synchronous motor.
Figure 9A:
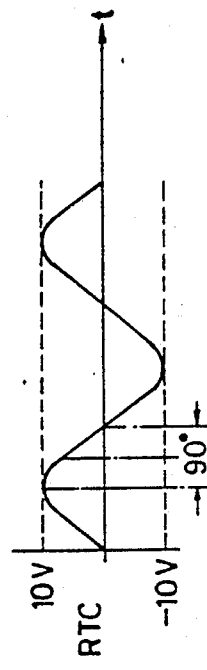
FIGS. 9A to 9C are timing charts for explaining the operation of the phase shifter.
Figure 9B:
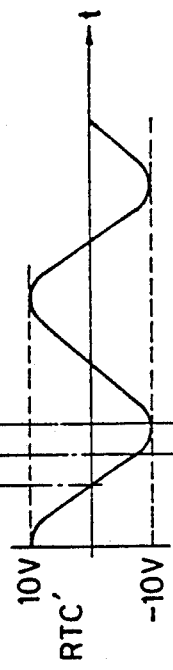
Figure 9C:
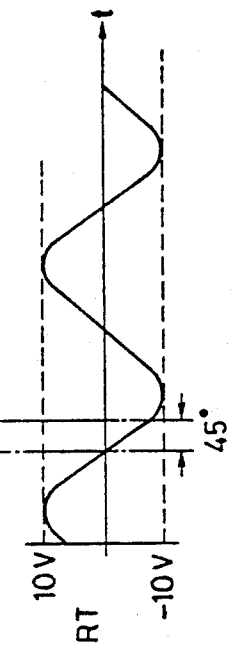

The signal processor 5 generates address signals for the ROMs 6, 7, 22, and 23 which correspond to the present speed signal Vs and the present rotor position in accordance with the signal S from the rotor position detector 2 (FIG. 1). The differential amplifier 8 receives the speed command V0, and generates an error signal VE, which is the difference between the voltage of the present speed signal Vs and the voltage of the speed command V0, through the filter 9. The U, V, and W current commands RTC, STC, and TTC are generated by the multiplying D/A converters 10 and 11 and the adder 2 in accordance with the error signal VE and the signals from the ROMs 6 and 7, in the same manner as in the conventional example of FIG. 2. The U and W phase commands, which lead the commands from the ROMs 6, 7 by a phase angle of 90°, are read out from the ROMs 22 and 23, respectively. These commands are multiplied by the multiplying D/A converters 24 and 25 by the saturation signal Vr from the above-mentioned saturation detector 30, thereby generating corrected U and W phase current commands RTC' and TTC'. The corrected U and W phase current commands RTC' and TTC' are added by the adder 26, which then generates the corrected V phase current command STC'. The current commands RTC, STC, and TTC and the corrected current commands RTC', STC', and TTC' are supplied to the phase shifters 27, 28, and 29. The phase shifters 27, 28, and 29 have an identical arrangement, so only the phase shifter 27 is illustrated in FIG. 5. The U phase current command RTC and the corrected U phase current command RTC' are added by the adder 38 and inverted by an inverter amplifier 39, thereby generating a corrected U phase current command RT. As shown in FIG. 9A, the U phase current command RTC from the multiplying D/A converter 10 is a sinusoidal wave varying between −10 V and +10 V. The corrected U phase current command RTC' from the multiplying D/A converter 24 is a sinusoidal wave advanced by 90° from the U phase current command RTC, as shown in FIG. 9B. The amplitude of the sinusoidal wave varies between 0 V and 10 V in accordance with the saturation signal Vr from the saturation detector 30. When the saturation voltage Vr of 0 V is developed, the output from the multiplying D/A converter 24 for multiplying the signal from the ROM 22 by the saturation signal Vr is just 0 V. However, when the saturation signal Vr is at maximum value (7 V in the above embodiment), the amplitude is 10 V, thereby generating the corrected U phase current command RTC', the waveform of which is indicated by the solid line in FIG. 9B. The current commands RTC and RTC' are added by the adder 38, and the output from the adder 38 is inverted by the inverter amplifier 39. When compared with the current command RTC (FIG. 9A), the inverted output from the phase shifter 27 has its waveform which is advanced by a maximum of 45°, as shown in FIG. 9C, and is generated as the corrected current command RT. That is, the current command RT corrected in accordance with the degree of saturation leads by a phase angle varying from 0° to 45° as compared with the conventional current command RTC. The corrected current command RT is also clamped by the Zener diode ZD2, and its amplitude is limited up to 10 V.

Corrected V and W phase current commands ST and TT are produced in the same manner as the corrected U phase current command ST.

The phase current commands RT, ST, and TT corrected in accordance with the degree of saturation are then supplied to the differential amplifiers 19 of the circuits 16, 17, and 18 as in a conventional case. Differences between the corrected phase current commands RT, ST, and TT and the present phase currents IR, IS, and IT, flowing in the phase windings and detected by the U and W current detectors 13 and 14 and the adder 15, are amplified. The amplified voltages are filtered by the filters 20 and are supplied to the PWM signal processor 21 as voltages Uv, Vv, and Wv corresponding to the phase command currents. The PWM signal processor and the transistor base-driven amplifier 21 receive the voltages Uv, Vv, and Wv and generate PWM signals PA to PF, thereby turning the transistor inverters TA to TF on/off. The phases are advanced in accordance with the degree of saturation and the permanent magnet synchronous motor M is thus controlled. As a result, when load torque is large, such that output voltages corresponding to the command currents flowing in the respective phases saturate and sufficient torque cannot be produced, the phases of the currents flowing in the respective phase windings are advanced to change the orthogonal relation between the winding current and the main flux of the magnetic field, thereby increasing the motor torque.

What is claimed is:

1. A method of controlling a permanent magnet synchronous motor by using pulse width modulation, comprising the steps of:
   (a) comparing a reference carrier wave with differences between detected armature currents and command signals for respective phase armature windings to obtain pulse width modulation signals;
   (b) controlling an inverter with the pulse width modulation signals
   (c) detecting a degree of saturation of voltage signals representing differences between the detected armature currents and the current command signals and determined by a peak value of the reference carrier wave; and
   (d) shifting phases of respective phase current command signals from those which provide an orthogonal relation between a resultant armature current and a main flux of a magnetic field, in accordance with the detected degree of saturation.

2. A method according to claim 1, wherein said step (d) comprises shifting the phases of the current command signals by adding phase current command signals of the respective phase armature windings which achieve the orthogonal relation between the resultant armature current and the main flux, and corrected phase current command signals which have phases advanced by 90° from the phase current command signals, and which have amplitudes varying in accordance with the degree of saturation.

3. A method according to claim 1, wherein said step (d) comprises shifting the phases of the current command signals in proportion to the detected degree of saturation when the degree of saturation of the difference voltage signals exceeds a predetermined value.

4. An apparatus for controlling a permanent magnet synchronous motor having a rotor, by using pulse width modulation, comprising:
   means for detecting a position of the rotor of the permanent magnet synchronous motor;
   first storage means for storing a first armature current command signal group of respective phases consisting of first armature current command signals which have values for providing an orthogonal relation between a resultant armature current and a main flux of a magnetic field, and which correspond to rotor positions;
   means for detecting the armature currents of the respective phases;
   means for comparing a reference carrier wave with difference signals representing differences between values of the first armature current command signals, read out from said first storage means in accordance with the detected rotor position, and values of the detected armature currents, and for generating pulse width modulation signals for the respective phases;
   an inverter for controlling the armature currents of the respective phases in response to the pulse width modulation signals;
   saturation detecting means for generating a saturation signal having a predetermined saturation value given in accordance with a peak value of the reference carrier wave and having a value as a predetermined function of the difference signals;
   second storage means for storing a second armature current command signal group of the respective phases consisting of second armature current command signals which have values for providing a relation shifted by a predetermined angle from the orthogonal between the resultant armature current and the main flux of the magnetic field, and which correspond to the rotor positions;
   correction signal generating means for converting values of the second armature current command signals of the respective phase windings read out from said second storage means in accordance with the rotor position, into correction signals, each having a value corresponding to a value of the saturation signal; and
   means for correcting the first armature current command signals in accordance with the correction signals to shift the phases of the difference signals.

5. An apparatus according to claim 4, wherein the second armature current command signals have phases advanced by 90° from those which provide the orthogonal relation between the resultant armature current and the main flux of the magnetic field.

6. An apparatus according to claim 4, wherein said saturation detecting means generates signal groups which have values determined as functions of the difference signals and correspond in number to the difference signals, and generates the saturation signal as a function of the sum of the values of the signal groups.

7. An apparatus according to claim 4, wherein said correction signal generating means multiplies values of each of the second armature current command signals of the respective phases by a value of the saturation signal to obtain the correction signals.

8. An apparatus according to claim 4, wherein said phase shift means adds the difference signals and the correction signals to shift the phases of the difference signals.

9. A method according to claim 2, wherein said step (d) comprises shifting the phases of the current command signals in proportion to the detected degree of saturation when the degree of saturation of the difference voltage signals exceeds a predetermined value.

10. An apparatus according to claim 5, wherein said saturation detecting means generates signal groups which have values determined as functions of the difference signals and correspond in number to the difference signals, and generates the saturation signal as a function of the sum of the values of the signal groups.

11. An apparatus according to claim 5, wherein said correction signal generating means multiplies values of each of the second armature current command signals of the respective phases by a value of the saturation signal to obtain the correction signals.

12. An apparatus according to claim 5, wherein said phase shift means adds the difference signals and the correction signals to shift the phases of the difference signals.

* * * * *

UNITED STATES PATENT AND TRADEMARK OFFICE
CERTIFICATE OF CORRECTION

PATENT NO. : 4,703,245
DATED : OCTOBER 27, 1987
INVENTOR(S) : KEIJI SAKAMOTO ET AL.

It is certified that error appears in the above-identified patent and that said Letters Patent is hereby corrected as shown below:

Col. 4, line 10, "." should be --;--.

Col. 5, line 61, "2" should be --12--.

Col. 8, line 14, after "orthogonal" insert --relation--.

Signed and Sealed this

Twelfth Day of April, 1988

Attest:

DONALD J. QUIGG

*Attesting Officer*   *Commissioner of Patents and Trademarks*